United States Patent [19]
Gaskill

[11] Patent Number: 5,823,483
[45] Date of Patent: Oct. 20, 1998

[54] UTENSIL-HOLDER ATTACHMENT FOR CONTAINERS

[76] Inventor: Garold B. Gaskill, 10285 SW. Mortatoc Dr., Tualatin, Oreg. 97062

[21] Appl. No.: 793,233

[22] PCT Filed: Aug. 24, 1995

[86] PCT No.: PCT/US95/10873

§ 371 Date: Feb. 18, 1997

§ 102(e) Date: Feb. 18, 1997

[87] PCT Pub. No.: WO96/05759

PCT Pub. Date: Feb. 29, 1996

Related U.S. Application Data

[63] Continuation-in-part of Ser. No. 296,315, Aug. 24, 1994, Pat. No. 5,518,211.

[51] Int. Cl.⁶ .............................. A47J 45/02; A47J 45/10
[52] U.S. Cl. ................. 248/37.6; 248/213.2; 248/316.7; 248/229.16
[58] Field of Search .................................. 248/37.3, 37.6, 248/213.2, 229.16, 229.26, 231.81, 316.7; 24/3.1, 3.12, 10 R, 11 R, 11 PP, 571

[56] References Cited

U.S. PATENT DOCUMENTS

| D. 31,665 | 10/1899 | McKay | D7/641 |
|---|---|---|---|
| 625,435 | 5/1899 | Clark | 248/37.6 |
| 2,713,469 | 7/1955 | Wright | 248/37.6 X |
| 2,826,206 | 3/1958 | Slater | 248/316.7 X |
| 3,485,468 | 12/1969 | Schweitzer. Jr. | 248/300 X |
| 4,991,803 | 2/1991 | Buder | 248/213.2 X |
| 5,518,211 | 5/1996 | Gaskill et al. | 248/37.6 |

FOREIGN PATENT DOCUMENTS 27218 1/1907 Austria ............................ 248/37.6

Primary Examiner—Ramon O. Ramirez
Assistant Examiner—Stephen S. Wentsler

[57] ABSTRACT

A utensil holder, supported by a vessel or container, permits a hand held utensil to be held until needed. The utensil for stirring or servicing or other operations is held conveniently above the vessel in a position which permits any residual contents from the vessel on the utensil to fall back into the vessel. A device to securely attach the utensil holder on the container is provided by an inner finger and outer spring arm with an upper stabilizer joined to the bottom end of the spring arm.

1 Claim, 4 Drawing Sheets

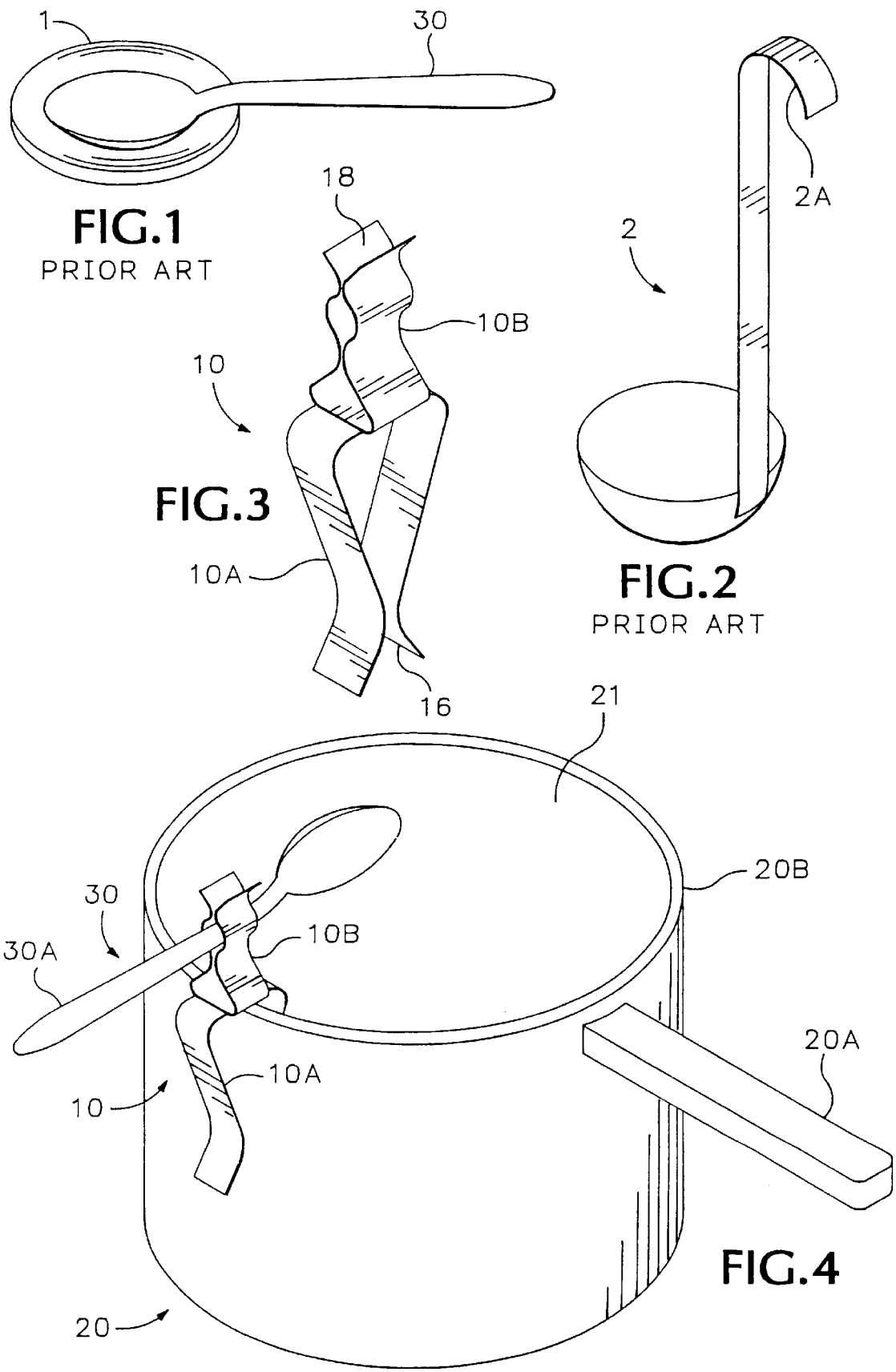

UTENSIL-HOLDER ATTACHMENT FOR CONTAINERS

This application is a continuation-in-part of U.S. application Ser. No. 08/296,315, filed Aug. 24, 1994, now U.S. Pat. No. 5,518,211.

BACKGROUND OF THE INVENTION

The present invention relates to holding household utensils and more particularly to attaching a hand-held household utensil to a container.

When cooking liquids such as sauces in a pot, spoons are often used for the occasional stirring required. When the spoon is not in use it is often laid down on the counter, or in a special spoon holder 1 laying on the counter (FIG. 1). In either case the spoon including the residual sauce may drip causing waste and requiring the counter or holder to be washed. Occasionally as the spoon is moved from the pot of liquid to the spoon holder some sauce clinging to the spoon will drip off onto the counter causing needless washing of the counter in addition to the spoon and spoon holder.

Sometimes, if the spoon is long enough, it can be leaned against the inside wall of the pot, pan or skillet containing the sauce or liquid thereby eliminating the dripping onto the counter. The spoon in this situation, if metal, can become hot and uncomfortable to hold. The spoon may also be deep enough in the pot to permit contact of the spoon handle with the contents of the pot. Thus, the spoon handle becomes very messy and difficult to hold.

If the spoon is not long enough, which is quite often the case, it falls down into the sauce and must then be retrieved by yet another utensil causing further washing and needless frustration for the cook. Some utensils used for commercial cooking have a hook at the end of the handle to hold the utensil on the lip of a deep pot. Again the handle may touch the pot's side wall, and hence the contents of the pot, causing the handle to become very messy and difficult to hold. While handles with hooked ends may be adequate for commercial purposes, most household utensils have no hooks. Clearly a better method for holding and retrieving a household hand-held utensil is needed.

Another object of this invention is to provide a better method to attach a spoon clip to the pot. When a spoon is removed vertically from a spoon holder attached to a pot, there are pot/spoon combinations where the clip comes off the pot and continues to be attached to the spoon. One such situation consists of a large handle wooden spoon in a clip attached to a thin wall stainless steel pan. In this situation, the spoon may be removed from the clip via rotation of the handle up and the spoon tip down (or the handle down, and the spoon tip up) the rotation preventing any vertical forces on the clip thus keeping the clip on the pot. For the ease of removal and a quality feel to the process, it is important that the clip be stable during spoon handle rotation. Spoon holders with long fingers engaging pot walls without lips and constant wall thickness provide adequate support to spoon rotation removal as in Kershner. However, pots often have large lips which require a more innovative design. Designs such as Wright provide for engagement of the clip with a pot including a large lip, but does not provide adequate stability to rotation removal.

SUMMARY OF THE INVENTION

It is an object of the present invention to reduce waste of residual contents carried on an utensil after being used to stir, mix or serve the vessel contents in a container.

It is a further object of the present invention to reduce the time and effort required to wash utensils and utensil support surfaces after the utensils and surfaces used to prepare and mix various substances.

It is yet a further object of the present invention to make a conventional hand-held utensil readily and safely available for stirring, serving or other operation.

The foregoing objects and advantages are achieved by having an utensil-holder attached or otherwise supported appropriately to a vessel or container of interest. An utensil-holder held by the vessel of interest, such as a pot, and permits a hand-held utensil, such as a spoon, to be held by the utensil-holder until needed. The utensil, when not in use, is attached to the utensil-holder in a position over the vessel permitting any residual contents from the vessel on the utensil to fall back into the vessel. The utensil, when attached to the utensil-holder, is conveniently available to be removed from the utensil-holder and used for stirring, serving or other operation in or around the vessel.

To improve stability of the clip on the pot (vessel) when removing the spoon (utensil), an innovative extension to the outer clip arm provides for equal resistance to rotation of the spoon in either direction regardless of the pot wall thickness. This stability is accomplished by providing for an outer pot pivot point which remains constantly between the top of the pot lip and the bottom part of the inside of the pot arm. As the outer clip arm swings down and away from the pot, the vertical extension becomes the pivot point maintaining the position of the pivot point in the middle between the top and bottom.

The foregoing features and advantages of the present invention will be more readily apparent from the following detailed description thereof, which proceeds with reference to the accompanying drawings.

BRIEF DESCRIPTION OF THE DRAWINGS

FIG. 1 shows a prior art curved counter spoon rest with spoon.

FIG. 2 shows a prior art commercial ladle with a hook.

FIG. 3 shows an utensil-holder according to the invention.

FIG. 4 shows the utensil-holder in FIG. 3 attached to a pot and holding a spoon.

DETAILED DESCRIPTION OF THE INVENTION

Figure 5:
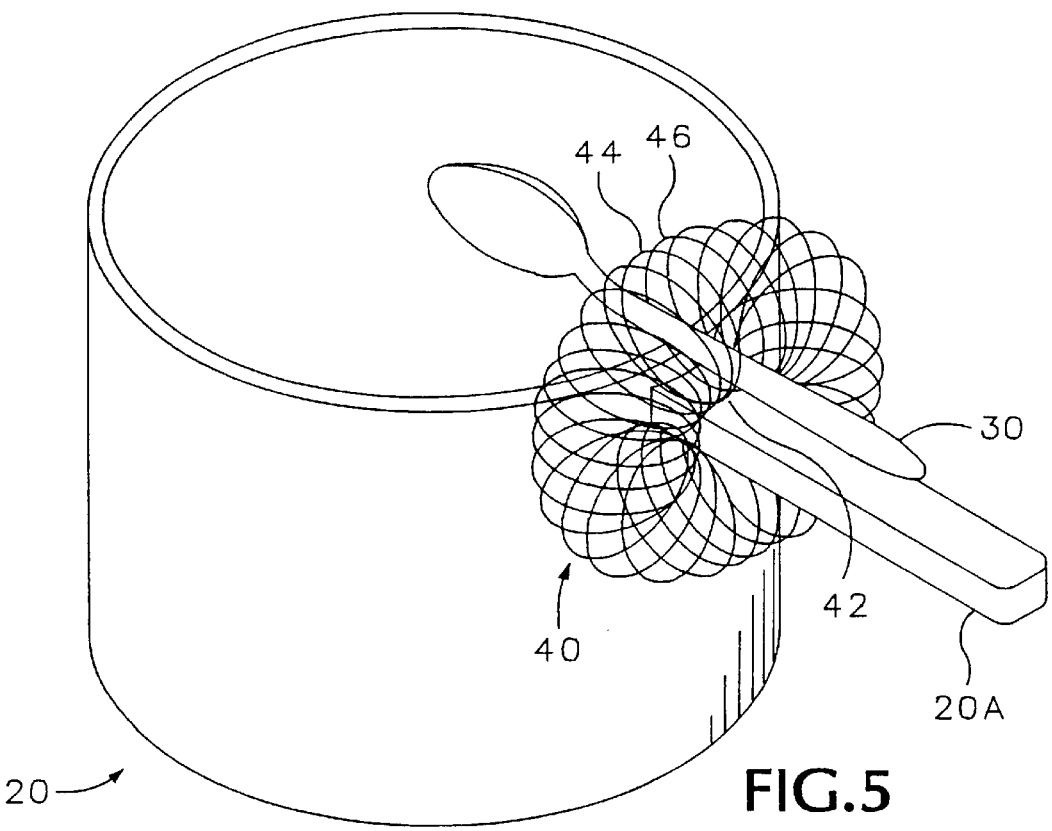
FIG. 5 shows an alternative embodiment of the invention using a circular spring.

Referring to FIG. 1, a spoon 30 is shown resting in a custom designed spoon rest 1. Referring to FIG. 2, a commercial ladle 2 is shown with a hook on the handle 2A which is used to rest on the pot rim.

Referring to FIGS. 3 and 4, an utensil-holder 10 includes a lower clip portion 10A attached to an upper clip portion 10B. The clips 10A and 10B are each made from spring steel. An upper slot 18 and a lower slot 16 are formed in the upper clip 10B and low clip 10A, respectively, between the opposite leafs of the "U-shaped" spring clips. The upper and lower slots extend in opposed directions and are aligned in perpendicular orientations.

The leaves of lower clip 10A are separated into an open position for receiving a portion of a vessel, such as pot 20 shown in FIG. 4. The lower clip 10A is then springingly retracts into a closed position about opposite sides of pot wall 20B, holding the upper clip 10B above a top opening 21 of pot 20. The leafs of upper clip 10B are also spread into an open position for receiving an utensil such as spoon 30 (FIG. 4) and springingly retractable into a closed position around opposite sides of utensil handle 30A.

Thus, utensil-holder 10 attaches to the pot, pan or other vessel side wall 20B while upper clip 10B is used to hold a spoon or other hand-held utensil 30. By holding the utensil handle 30A and rotating the utensil handle up and in toward the center of pot 20, spoon 30 is moved in and out of upper clip 10B. Lower clip 10A is securely attached to the pot wall 20B so that the utensil-holder 10 is not pulled off while the spoon 30 is removed.

If spoon 30 is placed in the holder at a point on the spoon where there is no clinging liquid and the level of the liquid is below lower clip 10A then the utensil-holder 10 will not need to be washed—thus saving time. In this position, the utensil 30 is in sight and readily available for stirring or other purposes.

Other embodiments of the invention also allow utensils to be held above the top of a container. For example, referring to FIG. 5, an alternative embodiment consists of a spring 40 formed into a circle which is placed around a handle 20A of the pot 20 as a method of attaching the utensil-holder to the pot. The spring 40 is expanded so that a center hole or slot 42 in spring 40 slidingly receives handle 20A. The spring then contracts conforming snugly around the handle 20A. Slots between adjacent coils 44 and 46 are then used to receive and hold utensil 30.

Figure 6:
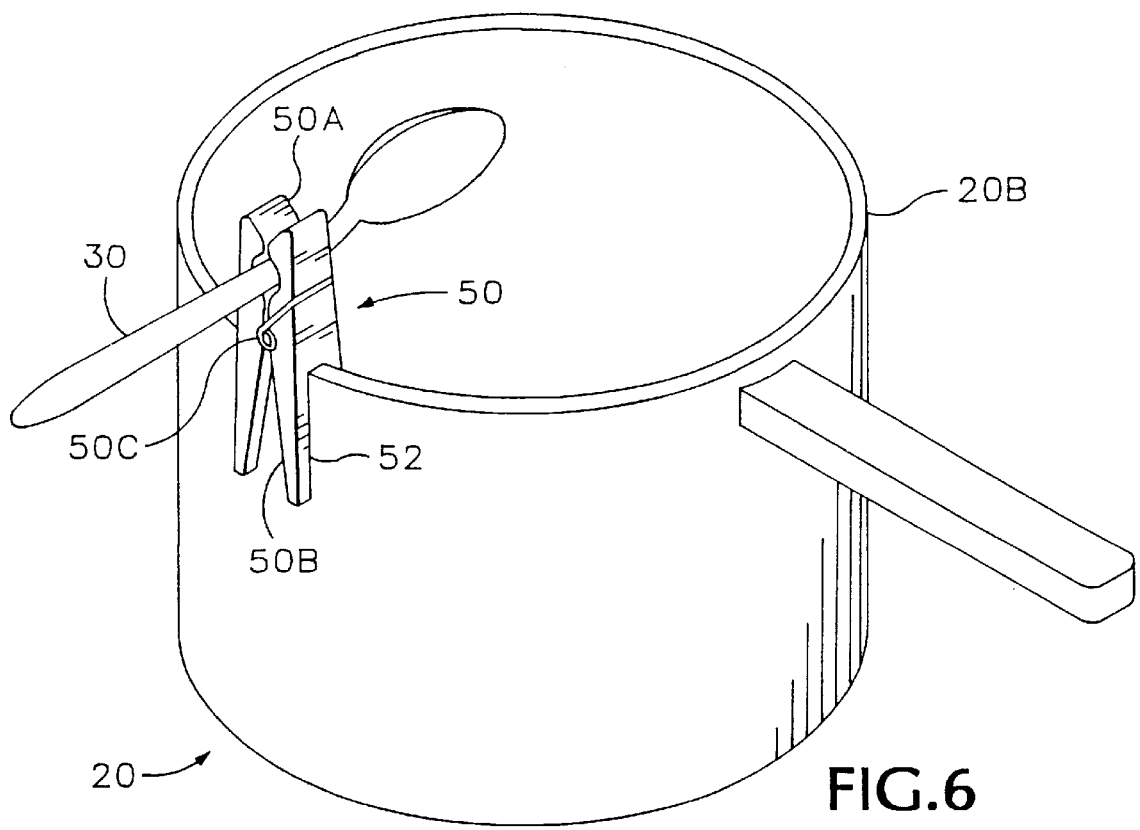
FIG. 6 shows another embodiment of the invention using some concepts of a conventional cloth's pin.

Referring to FIG. 6, another embodiment of the invention includes using a clip 50 having a design similar to the common clothes' pin. The clip 50 has a first finger 50A and a second finger 50B attached together with a spring 50C. A bottom end of each finger has a slit 52 for slidingly receiving the side wall 20B of the pot 20. The slits 52 are aligned together in a bottom portion of first and second fingers, respectively. The first and second fingers form a second slit which are moved apart to receive the handle of spoon 30. The fingers are then compressed together by spring 50C holding the handle of spoon 30 in compression.

Figure 7:
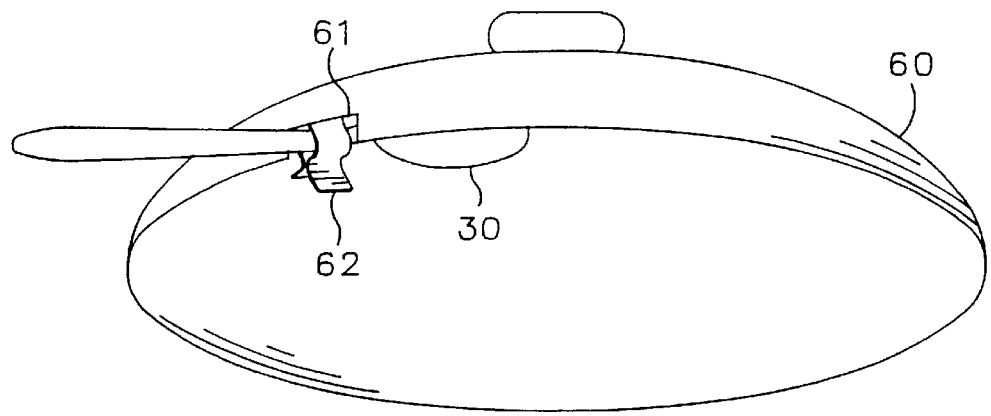
FIG. 7 shows another embodiment of the utensil-holder attached to a conventional lid.

Referring to FIG. 7, a lid 60 covers the top opening of a pot. For example, lid 60 attaches onto and covers the top of pot 20 previously shown in FIG. 4. The lid 60 includes a clip 62 similar to upper clip 10B shown in FIG. 3. The clip 62 attaches to the underside of lid 60 for receiving an utensil such as spoon 30. The lid 60 includes a cut-out 61 that permits a portion of the handle of spoon 30, or other hand-held utensil, to protrude out beyond the parameter of lid 60 and above a bottom edge. Cut-out 61 allows the lid to be fully cover the top of a pot while the spoon handle extends outside the exterior of the lid. Thus, the handle can reside outside the interior sections of the lid and pot during cooking sessions allowing the spoon handle to remain cool.

Figure 8:
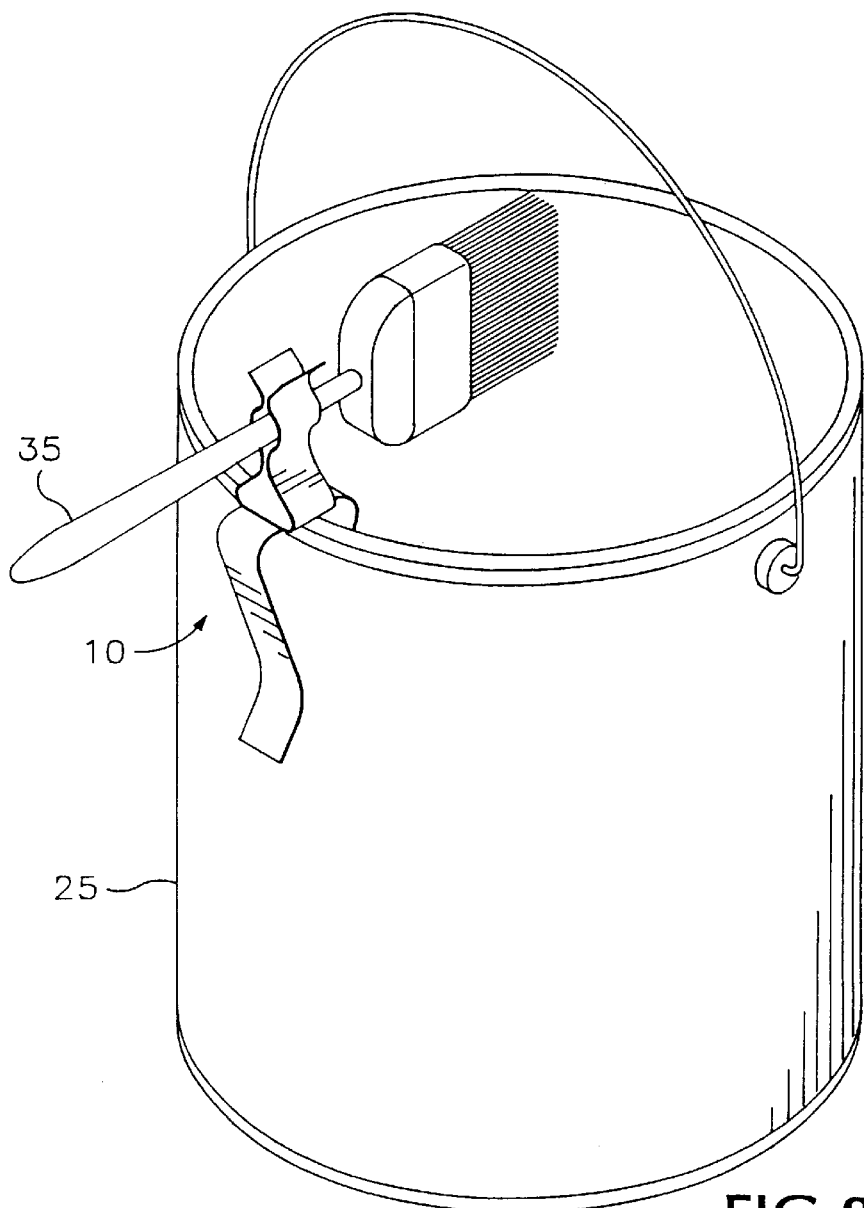
FIG. 8 shows the utensil-holder shown in FIG. 3 holding a paint brush over a paint pail.

The utensil-holders shown above may perform more functions than that of holding a stirring spoon for a pot. For example, the utensil-holder may also be used to hold a serving spoon or other utensil to serve foods or liquids from a serving dish. The utensil-holder may also be used to hold a spoon over a cup or mug. Referring to FIG. 8, the utensil-holder in a larger form may also be used to hold a paint brush 35 over a can of paint 25.

Figure 9:
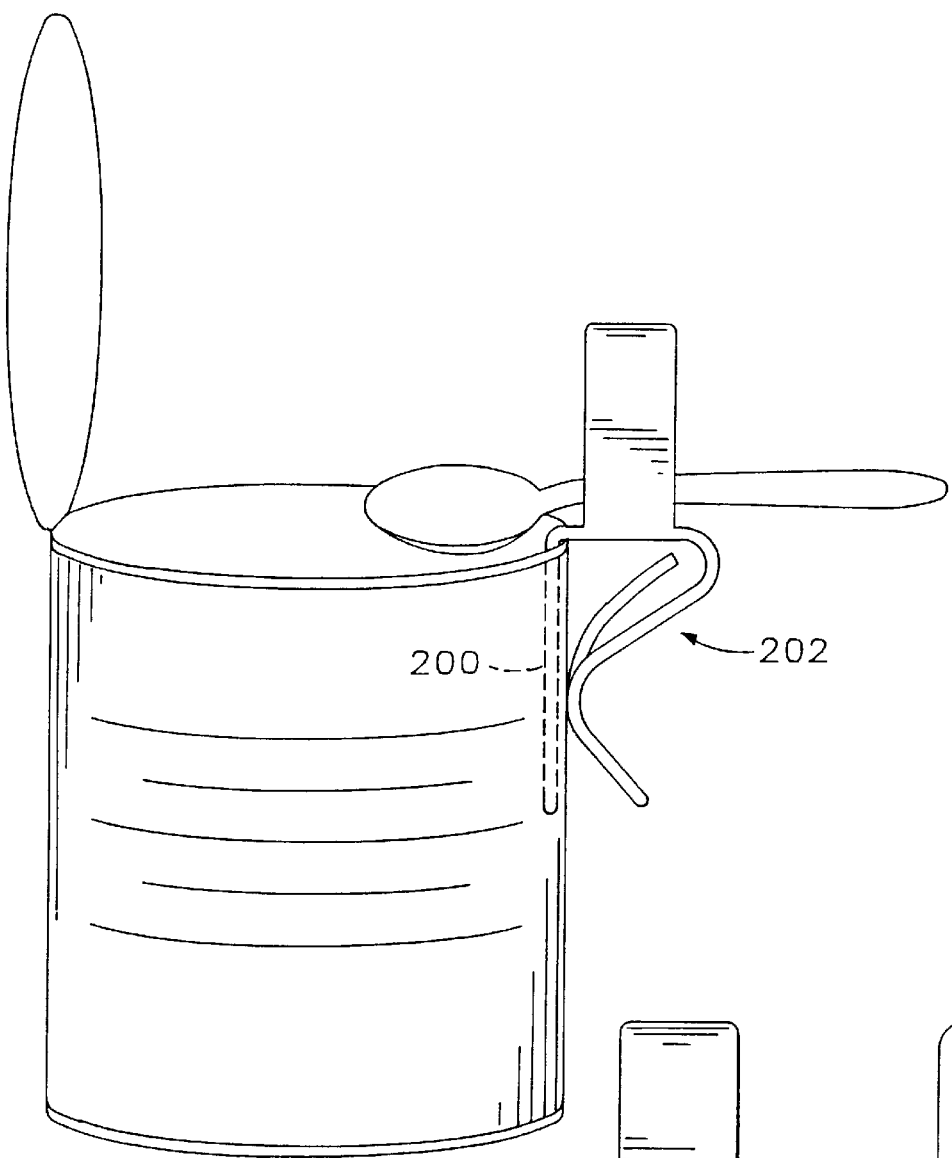
FIG. 9 is a perspective view showing the utensil-holder attached to a utensil according to another embodiment of the invention.
Figures 10, 11:
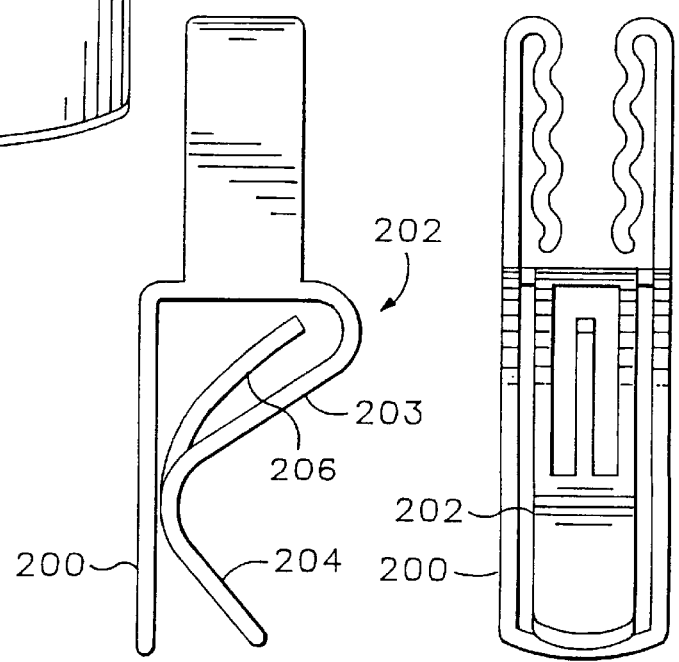
FIG. 10 is a side view of the utensil-holder according to the invention.
FIG. 11 is a front view of the utensil-holder according to the invention.

Referring to FIG. 9, the invention addresses stability during spoon rotation removal on pots with or without lips and with small or large wall thickness. The invention, like prior art, provides for an inside-the-pot finger 200 (inner finger) and an outside-the-pot finger 202 (outer finger). The outer finger 202 in the present invention has three portions as seen in FIG. 10. The outwardly curved spring arm 203 provides clearance for the lip and absorbs the strain associated with defection due to insertion over the lip and on the pot wall. A second portion 204 attached to the portion of the curved spring arm which touches the pot, consisting of a downward and outward curved portion designed to contact the outside portion of the lip on insertion to the pot and provide stability under utensil handle downward rotation. A third portion 206 attached to the portion of the curved spring arm touching the pot, consisting of an upward and outwards curved finger portion provides stability under utensil handle upward rotation and permits easy removal of the clip over large pot lips. As the spring arm 203 is deflected by the pot, the portion in contact with the pot rotates down and out. In an ordinary design and a thin pot wall, the pivot point for rotation is normally half-way between the top and bottom of the inside pot finger 200, providing equal resistance to up or down rotation of the utensil. If the pot wall is thick, the contact with the pot in an ordinary design would move down providing unequal resistance to rotation vectors along the wall. With a thick pot in an ordinary design, there would be less resistance to upward rotation and more resistance to downward rotation. In addition, the thicker pot wall provides additional resistance to rotation. The improvement of the upward and outwardly curved finger portion 206 provides a longer spring arm reducing the force required as the defection due to the pot wall is increased. The improvement of the upward and outwardly curved finger portion comes into contact with the pot and maintains the pivot point equally between the top and bottom of the inner finger providing equal resistance to rotation in either direction. The invention allows for a large range of pan wall and lip thickness while still providing stability under rotation of the spoon in either an upward or downward direction.

In view of the many possible embodiments and uses to which our invention is applicable, it should be recognized that the detailed embodiment is illustrative only and should not be taken as limiting the scope of our invention. Rather, we claim as our invention all such embodiments as may fall within the scope and spirit of the following claims and equivalents thereto.

I claim:

1. A device (200, 10B, 203, 204, 206) for securing a utensil (30) on vessels (20) having variable wall thickness, comprising:

an inner finger (200) having an upper end and a lower end;

a utensil clip (10B) having a front end and a rear end, the front end joined to the upper end of the inner finger;

a spring arm (203) having a top end and a bottom end, the top end joined to the rear end of the utensil clip, and the bottom end approaching the inner finger between the upper end and the lower end of the inner finger;

a lower stabilizer (204) joined to the bottom end of the spring arm, the lower stabilizer extending downward and away from the inner finger; and an upper stabilizer (206) joined to the bottom end of the spring arm, the upper stabilizer extending upward and away from the inner finger.

* * * * *